US010761685B2

(12) United States Patent
Zhang et al.

(10) Patent No.: US 10,761,685 B2
(45) Date of Patent: Sep. 1, 2020

(54) INTELLIGENT REST CLIENT FOR OPERATING A DATA STORAGE SYSTEM

(71) Applicant: EMC IP Holding Company LLC, Hopkinton, MA (US)

(72) Inventors: Jichao Zhang, Shanghai (CN); Sherman Liu, Shanghai (CN); Nicholas Wei, Shanghai (CN); Hao Sun, Shanghai (CN); James O. Pendergraft, Raleigh, NC (US); Seven Duan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 15/797,738

(22) Filed: Oct. 30, 2017

(65) Prior Publication Data

US 2019/0129577 A1    May 2, 2019

(51) Int. Cl.
*G06F 3/0482* (2013.01)
*G06F 16/951* (2019.01)
*H04L 29/06* (2006.01)
*G06F 16/958* (2019.01)
*G06F 16/955* (2019.01)
*H01L 29/08* (2006.01)
*G06F 40/14* (2020.01)
*H04L 29/08* (2006.01)

(52) U.S. Cl.
CPC .......... *G06F 3/0482* (2013.01); *G06F 16/951* (2019.01); *G06F 16/958* (2019.01); *G06F 16/9566* (2019.01); *G06F 40/14* (2020.01); *H04L 67/1097* (2013.01); *H04L 69/26* (2013.01); *H04L 67/02* (2013.01); *H04L 67/42* (2013.01)

(58) Field of Classification Search
CPC .. G06F 3/0482; G06F 16/958; G06F 16/9566; G06F 16/951; G06F 17/2247; H04L 67/42; H04L 67/02
See application file for complete search history.

(56) References Cited

U.S. PATENT DOCUMENTS

| | | | |
|---|---|---|---|
| 7,010,796 | B1 | 3/2006 | Strom et al. |
| 8,972,405 | B1 | 3/2015 | Chaulk et al. |
| 9,432,484 | B1 | 8/2016 | Xie et al. |
| 9,491,241 | B1 | 11/2016 | Wan et al. |

(Continued)

*Primary Examiner* — Austin J Moreau
(74) *Attorney, Agent, or Firm* — BainwoodHuang

(57) ABSTRACT

Improved systems, methods, and techniques for generating representational state transfer (REST) requests from a client computer to a server computer. The disclosed techniques employ a REST application programming interface (also referred to as the "RESTful API") for use in receiving the REST requests at the server computer from the client computer, and providing REST responses from the server computer to the client computer. The disclosed techniques further employ an intelligent REST client configured as a webpage (also referred to as the "intelligent REST client webpage") that can be accessed by a browser running on the client computer, and transmitted or otherwise served by the server computer for display on the browser of the client computer. The intelligent REST client webpage may be employed by a user of the client computer for efficiently interacting with the RESTful API of the server computer.

17 Claims, 6 Drawing Sheets

(56) References Cited

U.S. PATENT DOCUMENTS

| | | |
|---|---|---|
| 9,626,257 B1 | 4/2017 | Tang et al. |
| 9,811,390 B1 | 11/2017 | Ma et al. |
| 2015/0095923 A1* | 4/2015 | Sarid .......................... G06F 8/30 |
| | | 719/328 |
| 2017/0102925 A1* | 4/2017 | Ali ............................ G06F 8/36 |

* cited by examiner

INTELLIGENT REST CLIENT FOR OPERATING A DATA STORAGE SYSTEM

BACKGROUND

Representational state transfer application programming interfaces (also referred to herein as the "RESTful APIs") generally correspond to a set of defined methods of communication between computer systems and/or software components over the Internet, and are typically associated with the client-server architectural style. Clients use the hypertext transfer protocol (HTTP) to send REST requests to the RESTful APIs of servers, using HTTP methods such as GET, POST, PUT, PATCH, and DELETE. Clients can use such HTTP methods in the REST requests to servers for reading data, creating data, updating/replacing data, partially updating/modifying data, and/or deleting data. Such REST requests generally contain all of the information necessary for the servers to service the requests. Such information can be contained in a REST request as part of a uniform resource locator (URL), one or more query-string parameters, the body of the request, and/or one or more headers of the request. For example, a client may send an HTTP GET request identifying a particular resource to a server to obtain data associated with one or more instances of the resource.

SUMMARY

When generating the HTTP GET request or other REST request, the user of the client typically employs an API console or browser plugin to manually enter the information needed by the server to service the request. Manually entering such information at an API console or browser plugin to generate REST requests can be problematic, however, because it generally requires the user of the client to know the types of resources available on the server computer, the instances of specific types of resources available on the server, the identifiers of specific instances, the properties, operations, and/or parameters supported by the server, etc., which often can only be obtained from the server or API documentation. However, consulting the server or API documentation for the required information, and then manually entering the information to generate a REST request can be very inefficient and time-consuming.

Improved systems, methods, and techniques are disclosed herein for generating representational state transfer (REST) requests from a client computer to a server computer, which, in one embodiment, can be implemented as a data storage system. The disclosed techniques employ a REST application programming interface (also referred to herein as the "RESTful API") for use in receiving the REST requests at the server computer from the client computer, and providing REST responses from the server computer to the client computer. The disclosed techniques further employ an intelligent REST client configured as a webpage (also referred to herein as the "intelligent REST client webpage") that can be accessed by a browser running on the client computer, and transmitted or otherwise served by the server computer for display on the browser of the client computer. The intelligent REST client webpage may be employed by a user of the client computer for efficiently interacting with the RESTful API of the server computer. Once served to the client computer, the intelligent REST client webpage automatically sends one or more types-feed queries to the server computer to obtain one or more sets of information pertaining to the types of resources available on the server computer, the properties, operations, and/or parameters supported by the server computer, etc. Having obtained such sets of information in one or more types-feed responses from the server computer, the intelligent REST client webpage can perform at least (i) auto-completion of a uniform resource locator (URL(s)) associated with a REST request, (ii) auto-generation of the body of the REST request, and (iii) syntax-checking of the REST request, using the sets of information obtained in the types-feed responses.

By serving an intelligent REST client webpage from a server computer to a client computer, automatically sending one or more types-feed queries from the intelligent REST client webpage to the server computer to obtain information pertaining to at least the resource types, and/or the properties, operations, and/or parameters available at and/or supported by the server computer, and using the obtained information at the intelligent REST client webpage to perform at least auto-completion of URLs, auto-generation of REST request bodies, and/or syntax-checking of REST requests, a user of the client computer can generate REST requests to the server computer with increased efficiency and reduced time expenditure.

In certain embodiments, a system for generating a representational state transfer (REST) request includes a data storage system including a RESTful application programming interface (RESTful API), and a client host computer running a browser application. The data storage system is configured and arranged to serve a REST client webpage to the client host computer for display on the browser application, and, having served the REST client webpage to the client host computer, to receive, at the RESTful API from the REST client webpage, a query request for information associated with a particular resource on the data storage system. The data storage system is further configured and arranged, in response to the query request, to send, via the RESTful API, a query response to the REST client webpage, the query response containing the information associated with the particular resource, and to receive, at the RESTful API, the REST request from the REST client webpage, the REST request containing at least some of the information sent to the REST client webpage in the query response.

In certain further embodiments, a method of generating a representational state transfer (REST) request to a data storage system using a browser running on a client host computer includes serving a REST client webpage from the data storage system to the client host computer. The REST client webpage is displayable on the browser running on the client host computer. The data storage system includes a RESTful application programming interface (RESTful API). The method further includes, having served the REST client webpage to the client host computer, receiving, at the RESTful API from the REST client webpage, a query request for information associated with a resource on the data storage system, and, in response to the query request, sending, via the RESTful API, a query response to the REST client webpage, the query response containing the information associated with the resource. The method still further includes receiving, at the RESTful API, the REST request from the REST client webpage, the REST request containing at least some of the information sent to the REST client webpage in the query response.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views.

DETAILED DESCRIPTION

Improved systems, methods, and techniques are disclosed herein for generating representational state transfer (REST) requests from a client computer to a server computer. The disclosed techniques employ a REST application programming interface (also referred to herein as the "RESTful API") for use in receiving the REST requests at the server computer from the client computer, and providing REST responses from the server computer to the client computer. The disclosed techniques further employ an intelligent REST client configured as a webpage that can be accessed by a browser running on the client computer, and transmitted or otherwise served by the server computer for display on the browser of the client computer. The intelligent REST client configured as a webpage may be employed by a user of the client computer for efficiently interacting with the RESTful API of the server computer.

Figure 1A:
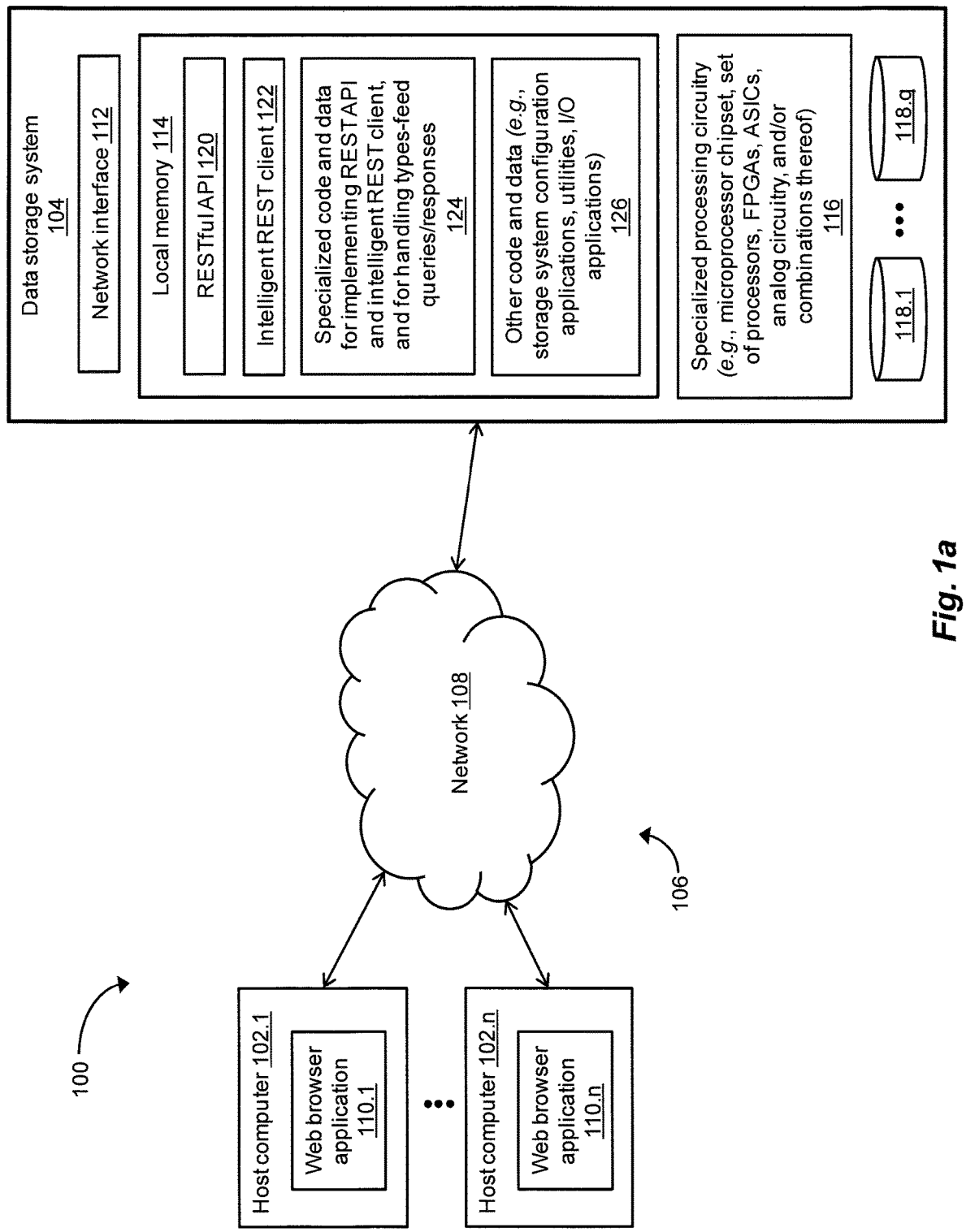
FIG. 1a is a block diagram of an exemplary storage system environment for generating representational state transfer (REST) requests from one or more client computers to a server computer, which can be implemented as a data storage system.

FIG. 1a depicts an illustrative embodiment of an exemplary storage system environment 100 for generating REST requests from one or more host (client) computers 102.1, . . . , 102.n to a server computer, which can be implemented as a data storage system 104. As shown in FIG. 1a, the respective host (client) computers 102.1, . . . , 102.n and the data storage system 104 are communicably coupled to a communications medium 106, which includes at least one network 108. For example, each of the respective host (client) computers 102.1, . . . , 102.n can be configured as a web server computer, a file server computer, an email server computer, an enterprise server computer, and/or any other suitable computer or computerized device. The respective host (client) computers 102.1, . . . , 102.n can provide input/output (I/O) requests (e.g., small computer system interface (SCSI) commands) to the data storage system 104 over the network 110. Such I/O requests can direct the data storage system 104 to store and/or retrieve data blocks from logical storage units (LUNs) and/or virtual volumes (VVOLs) on behalf of the respective host (client) computers 102.1, 102.n.

The communications medium 106 including the network 110 can be configured to interconnect the respective host (client) computers 102.1, . . . , 102.n and the data storage system 104 to enable them to communicate and exchange signaling with one another. As shown in FIG. 1a, at least a portion of the communications medium 106 is illustrated as a "cloud" to indicate that the communications medium 106 can have a variety of different topologies, including, but not limited to, a backbone topology, a hub-and-spoke topology, a loop topology, an irregular topology, or any suitable combination thereof. The communications medium 106 can also include, but is not limited to, copper-based data communications devices and cabling, fiber optic-based devices and cabling, wireless devices, or any suitable combination thereof. In addition, the communications medium 106 can be configured to support storage area network (SAN)-based communications, local area network (LAN)-based communications, cellular communications, wide area network (WAN)-based communications, distributed infrastructure communications, and so on, or any suitable combination thereof. It is noted that the respective host (client) computers 102.1, . . . , 102.n can connect with management IP via this network.

As shown in FIG. 1a, the host (client) computers 102.1, . . . , 102.n can be configured to run web browser applications 110.1, . . . , 110.n, respectively. Further, the data storage system 104 can include a network interface 112, a local memory 114, specialized processing circuitry 116, and one or more data storage devices 118.1, . . . , 118.q. The network interface 112 can be configured to connect the data storage system 104 as a node on the network 108, enabling access to/from the respective host (client) computers 102.1, . . . , 102.n. Such access over the network 108 can be Internet protocol (IP)-based, or IP-based combined with SAN-based, cellular-based, cable-based, fiber optic-based, cloud-based, and/or wireless, and so on. The local memory 114 of the data storage system 104 can be configured to include volatile storage (e.g., dynamic random access memory (DRAM), static random access memory (SRAM)), as well as non-volatile storage (e.g., magnetic memory, flash memory).

The local memory 114 (see FIG. 1a) within the data storage system 104 can be configured to store a variety of software constructs, including a RESTful API 120, an intelligent REST client 122, specialized code and data 124, and other code and data 126. The specialized code and data 124 can include one or more sets of instructions that direct the specialized processing circuitry 116 to implement the systems, methods, and techniques for generating REST requests from one or more of the host (client) computers 102.1, . . . , 102.n to the data storage system 104 using the RESTful API 120 and the intelligent REST client 122, as described herein. The other code and data 126 can include one or more further sets of instructions that direct the specialized processing circuitry 116 to perform input/output (I/O) operations involving the respective storage devices 118.1, . . . , 118.q, as well as various other operations involving, for example, administrative tools, utilities, other user-level applications, and so on. The specialized processing circuitry 116 is configured to operate in accordance with the RESTful API 120, the intelligent REST client 122, the specialized code and data 124, and/or the other code and data 126 stored in the local memory 114. It is noted that the specialized processing circuitry 116 can be implemented in a variety of ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof.

In the context of the specialized processing circuitry 116 (see FIG. 1a) being implemented using one or more processors running specialized software, a computer program product can be configured to deliver all or a portion(s) of the RESTful API 120, the intelligent REST client 122, the specialized code and data 124, and/or the other code and data 126 to the specialized processing circuitry 116. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by one or more of the processors, perform the methods described herein. Such media may be considered to be articles of manufacture, and may be transportable from one data storage system to another data storage system.

The data storage devices 118.1, . . . , 118.q (see FIG. 1a) within the data storage system 104 can include one or more of volatile memory, non-volatile memory, hard disk drives (HDDs), solid state drives (SSDs), tape drives, optical drives, network attached storage (NAS) devices, SAN devices, and so on. Each data storage device 118.1, . . . , 118.q can be locally attached to an I/O channel of the data storage system 104, while also being accessible over the network 108. Further, each data storage device 118.1, . . . , 118.q can be a single stand-alone component, or a system of data storage devices such as a collection of drives (e.g., a redundant array of inexpensive disks (RAID) group) logically operating together as a unified storage device to provide a desired level of data protection through redundancy. Such a RAID group can be configured to store large quantities of data for access by one or more processors operative to handle requests for allocation, as well as host I/O requests.

The systems, methods, and techniques disclosed herein employ the RESTful API 120 (see FIG. 1a) for receiving REST requests at the data storage system 104 from one or more of the respective host (client) computers 102.1, . . . , 102.n, and providing REST responses from the data storage system 104 to one or more of the respective host (client) computers 102.1, . . . , 102.n. In one embodiment, the hypertext transfer protocol (HTTP) may be employed to send REST requests from the respective host (client) computers 102.1, . . . , 102.n to the RESTful API 120 of the data storage system 104, using HTTP methods such as GET, POST, PUT, PATCH, and DELETE. Users of the respective host (client) computers 102.1, . . . , 102.n can send such HTTP methods in REST requests to the data storage system 104 for reading data, creating data, updating/replacing data, partially updating/modifying data, and/or deleting data associated with one or more resources of the data storage system 104. Such REST requests generally contain all of the information necessary for the data storage system 104 to service the requests. Such information can be contained in a REST request as part of a uniform resource locator (URL), one or more query-string parameters, the body of the REST request, and/or one or more headers of the REST request. For example, a user of one of the host (client) computers 102.1, . . . , 102.n may send an HTTP GET request identifying a particular resource (e.g., a file, a LUN, a VVOL) to the data storage system 104 to obtain data associated with one or more instances of the particular resource.

Figure 1B:
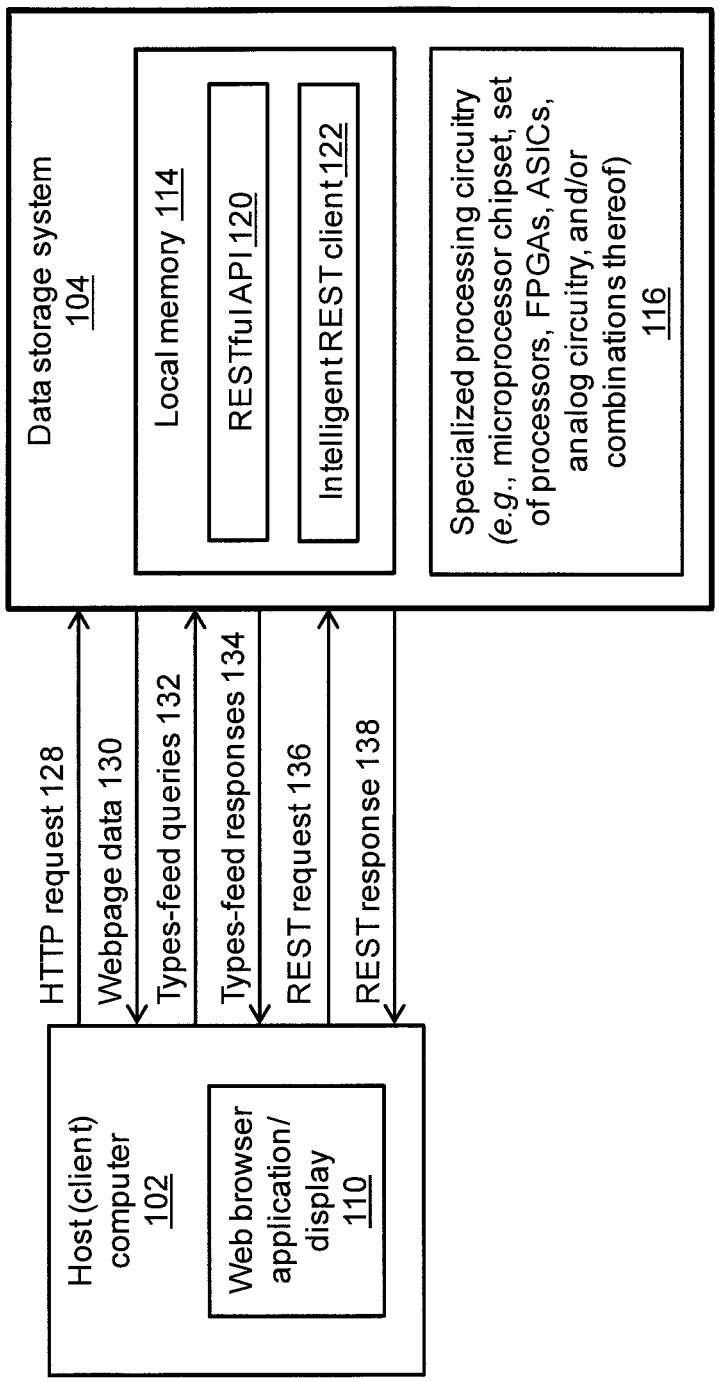
FIG. 1b is a block diagram of a respective client computer among the one or more client computers of FIG. 1a, as well as the data storage system of FIG. 1a, in which the respective client computer interacts with a RESTful application programming interface (RESTful API) of the data storage system using an exemplary intelligent REST client webpage served by the data storage system to the respective client computer.

FIG. 1b depicts a respective host (client) computer 102 among the one or more host (client) computers 102.1, . . . , 102.n of FIG. 1a, as well as the data storage system 104. As shown in FIG. 1b, the host (client) computer 102 includes a web browser application 110 (also referred to herein as the "web browser"), and the data storage system 104 includes the local memory 114 with the RESTful API 120 and the intelligent REST client 122, and the specialized processing circuitry 116. It is noted that FIG. 1b depicts only the local memory 114 and the specialized processing circuitry 116 within the data storage system 104 for clarity of illustration. It is further noted that the network 108 (see FIG. 1a) is also omitted from FIG. 1b for clarity of illustration.

The disclosed systems, methods, and techniques employ the intelligent REST client 122 of the data storage system 104 configured as a webpage (also referred to herein as the "intelligent REST client webpage"), which can be accessed by the web browser 110 running on the host (client) computer 102 (see FIG. 1b), and transmitted or otherwise served by the data storage system 104 for display on the web browser 110 of the host (client) computer 102. The intelligent REST client webpage 122 (which can be based on the JavaScript programming language, or any other suitable programming language) may be employed by a user of the host (client) computer 102 for efficiently interacting with the RESTful API 120 of the data storage system 104. For example, the user of the host (client) computer 102 may enter an HTTP request 128 (see also FIG. 1b) to load the intelligent REST client webpage 122 on the web browser 110, and send the HTTP request 128 over the network 108.

Having received the HTTP request 128 from the host (client) computer 102, the data storage system 104 can transmit webpage data 130 over the network 108 to serve the intelligent REST client webpage 122 to the host (client) computer 102 for display on the web browser 110. Once served to the host (client) computer 102, the intelligent REST client webpage automatically sends one or more types-feed queries 132 to the data storage system 104 to obtain metadata describing the application programming interfaces (APIs), including, but not limited to, one or more sets of information pertaining to the types of resources available on the data storage system 104, the properties, operations, and/or parameters supported by the data storage system 104, etc. The data storage system 104 generates one or more types-feed responses 134 containing such metadata describing the APIs, including the sets of information pertaining to the types of resources available on the data storage system 104, the properties, operations, and/or parameters supported by the data storage system 104, etc., and transmits the types-feed responses 134 to the host (client) computer 102.

In one embodiment, an exemplary types-feed query may be expressed, as follows:

GET https://10.108.53.149/api/types/
user?fields=attributes. (1)

This exemplary types-feed query corresponds to a query for the available fields or properties associated with a particular resource on the data storage system 104. In one embodiment, the exemplary types-feed query can be an HTTP GET request, in accordance with the RESTful API 120. The exemplary types-feed query includes a types-feed parameter "fields=attributes", requesting a list of the available and supported properties of the particular resource that may be requested by the user of the host (client) computer 102.

In one embodiment, an exemplary types-feed response to the foregoing exemplary types-feed query may be expressed, as follows:

```
"attributes": {                                                    (2)
    {     "name": "id",
          "type": "String",
          "description": "Unique identifier of the user instance." },
    {     "name": "name",
          "type": "String",
          "description": "Name of the user." },
    }.
```

This exemplary types-feed response to the foregoing exemplary types-feed query returns a list of available and supported properties of the particular resource type. The list of supported properties includes two available properties, namely, an "identifier" property and a "name" property. It is noted that the list of supported properties provided in the exemplary types-feed response may optionally include additional values describing each property in the list of properties. For example, the list of properties may include a "type" of the property, a "description" of the property, a "role" of the property, and/or any other suitable value(s) describing each available property that may be useful to the user of the host (client) computer 102. The additional values describing each property may further involve type-specific information for syntax checking, such as (i) for numbers, minimum (min) and maximum (max), (ii) for strings, min length and max length, (iii) allowed characters, (iv) regular expressions (regex), (v) possible restrictions on enumerated (enum) values, and so on. For example, such additional values/information may be inputted by a user in the body of a POST (or PATCH) request.

It is noted that the intelligent REST client webpage can send one or more resource queries to the data storage system 104 on-demand to obtain one or more identifiers of resources. For example, an exemplary resource query for obtaining user identifiers may be expressed, as follows:

/api/types/user/instances.                                         (3)

Such a resource query can be sent on-demand when the intelligent REST client webpage, based on the current context, determines that the user of the host (client) computer 102 wishes to input the identifier of a specific resource.

Having obtained such sets of information in the types-feed responses 134 from the data storage system 104, the intelligent REST client webpage 122 (as displayed to the user on the web browser 110) can perform at least (i) auto-completion of a URL associated with a REST request 136 generated at the host (client computer), (ii) auto-generation of the body of the REST request 136, and (iii) syntax-checking of the REST request 136, using the sets of information obtained from the types-feed responses 134. The user of the host (client) computer 102 can then send the REST request 136 to the data storage system 104, which can process the REST request 136 and transmit an appropriate REST response 138 to the host (client) computer 102.

By serving the intelligent REST client webpage 122 from the data storage system 104 to the host (client) computer 102, automatically sending one or more types-feed queries from the intelligent REST client webpage 122 (as displayed to the user on the web browser 110) to the data storage system 104 to obtain metadata describing the APIs, including, but not limited to, one or more sets of information pertaining to the types of resources available on the data storage system 104, the properties, operations, and/or parameters supported by the data storage system 104, etc., and using the obtained information at the intelligent REST client webpage 122 displayed on the web browser 110 to perform at least auto-completion of URLs, auto-generation of REST request bodies, and/or syntax-checking of REST requests, a user of the host (client) computer 102 can generate REST requests to the data storage system 104 with increased efficiency and reduced time expenditure.

Figure 2A:
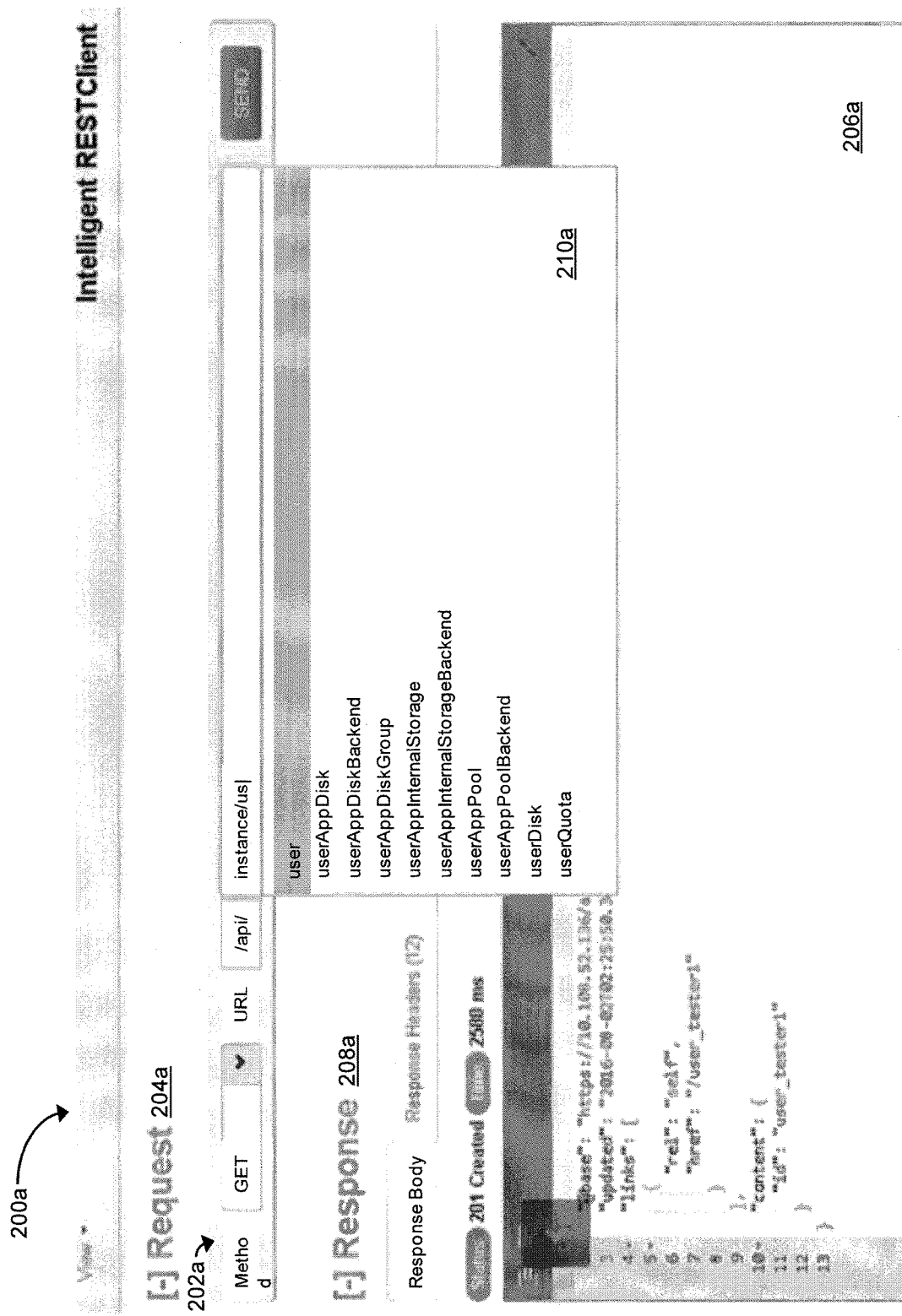
FIG. 2a is a first illustration of the intelligent REST client webpage of FIG. 1b, in which the intelligent REST client webpage is configured to allow a user of the respective client computer to generate a REST request using the hypertext transfer protocol (HTTP) GET request method.

The disclosed systems, methods, and techniques, as well as many of their attendant advantages, will be further understood with reference to the following illustrative examples, and FIGS. 1b and 2a-2c. In a first example, FIG. 2a depicts an illustration of an exemplary intelligent REST client webpage 200a, as displayed to the user of the host (client) computer 102 (see FIG. 1b) on the web browser 110. As shown in FIG. 2a, the intelligent REST client webpage 200a includes a user input area 202a for entering parameters required by a SET request, as well as a display region 206a for displaying the body of a REST response 208a corresponding to a REST request 204a. It is noted that such a SET request can lead to a state change of a storage resource, such as "create user/filesystem" or "shrink filesystem". For example, the body of the REST response 208a may be in JSON format, or any other suitable format. As shown in the user input area 202a, the user of the host (client) computer 102 has entered an exemplary HTTP GET request that includes the HTTP method "GET", as well as a partial URL that includes a first level resource path "api", a second level resource path "instance", and a partial third level resource path that begins with the letters, "us". In this first example, it is assumed that the user of the host (client) computer 102 does not know the complete designation of the third level resource path that begins with the letters "us". As described herein, however, once served to the host (client) computer 102, the intelligent REST client webpage 200a can automatically send one or more types-feed queries 132 to the data storage system 104 to obtain, in one or more types-feed responses 134, metadata describing the APIs, including, but not limited to, one or more sets of information pertaining to the types of resources (or objects) available on the data storage system 104 (e.g., filesystem, nfsShare, LUN, user, etc.), the attributes of resources, the resource methods, the method arguments, the properties, operations, and/or parameters supported by the data storage system 104, etc.

FIG. 2a further depicts, in a drop-down menu 210a, a plurality of possible identifiers for the third level resource path beginning with the letters "us", which were obtained from the types-feed response(s) 134 received at the intelligent REST client webpage 200a. As shown in FIG. 2a, the plurality of possible identifiers for the third level resource path that begin with the letters "us" can include "user", "userAppDisk", "userAppDiskBackend", "userAppDiskGroup", "userAppInternalStorage", "userAppInternalStorageBackend", "userAppPool", "userAppPoolBackend", "userDisk", and "userQuota", or any other suitable identifier. In this first example, once the user of the host (client) computer 102 enters one or both of the first two letters "us" of the third level resource path using any suitable input device (e.g., a keyboard), the drop-down menu 210a automatically appears to display the plurality of possible identifiers for the third level resource path beginning with the letters "us". The user of the host (client) computer 102 can then select from the plurality of possible identifiers displayed in the drop-down menu 210a using any suitable input device (e.g., a trackpad) to auto-complete the third level resource path included in the partial URL of the exemplary HTTP GET request. For example, the user of the host (client) computer 102 can select the identifier "user", as indicated by the shaded region of the drop-down menu 210a. Further, once the identifier "user" is selected, the intelligent REST client webpage 200a can at least partially auto-complete the URL, as follows:

URL: /api/instance/user. (4)

It is noted that without the capability of the intelligent REST client webpage 200a to auto-complete the third level resource path included in the partial URL of the HTTP GET request (see FIG. 2a), the user of the host (client) computer 102 may find it necessary to perform a REST user query to obtain a list of possible identifiers (IDs), and manually enter the information ("user") to complete the third level resource path of the partial URL.

Figure 2B:
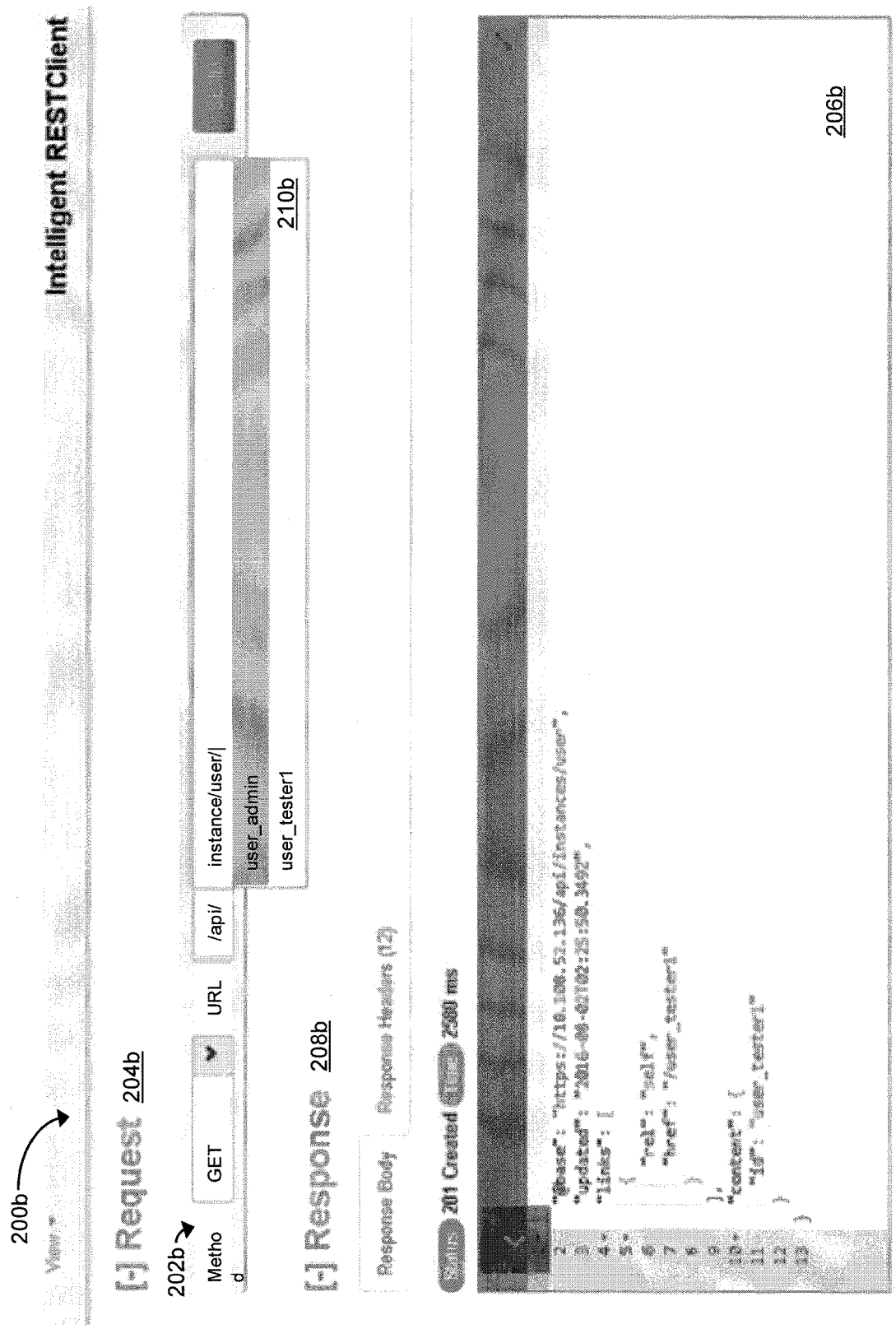
FIG. 2b is a second illustration of the intelligent REST client webpage of FIG. 1b, in which the intelligent REST client webpage is further configured to allow the user of the respective client computer to generate the REST request of FIG. 2a, using the HTTP GET request method.

In a second example, FIG. 2b depicts an illustration of an exemplary intelligent REST client webpage 200b, as displayed to the user of the host (client) computer 102 (see FIG. 1b) on the web browser 110. As shown in FIG. 2b, the intelligent REST client webpage 200b includes a user input area 202b for entering parameters required by a SET request, as well as a display region 206b for displaying the body of a REST response 208b corresponding to a REST request 204b. As shown in the user input area 202b, the user of the host (client) computer 102 has entered an exemplary HTTP GET request that includes the HTTP method "GET", as well as a partial URL that includes the first level resource path "api", the second level resource path "instance", and the third level resource path "user" (see also FIG. 2a). In this second example, it is assumed that the user of the host (client) computer 102 does not know the designations of a fourth level resource path identifying possible users of the intelligent REST client webpage 200b. As described herein, however, once served to the host (client) computer 102, the intelligent REST client webpage 200b can automatically send one or more types-feed queries 132 to the data storage system 104 to obtain, in one or more types-feed responses 134, metadata describing the APIs, including, but not limited to, one or more sets of information pertaining to the types of resources (or objects) available on the data storage system 104 (e.g., filesystem, nfsShare, LUN, user, etc.), the attributes of resources, the resource methods, the method arguments, the properties, operations, and/or parameters supported by the data storage system 104, etc.

FIG. 2b further depicts, in a drop-down menu 210b, a plurality of identifiers of possible users of the intelligent REST client webpage 200b, which were obtained on-demand from the data storage system 104 in response to a resource query from the intelligent REST client webpage 200b. As shown in FIG. 2b, the plurality of identifiers of possible users of the intelligent REST client webpage 200b can include "user_admin" and "user_tester1". The user of the host (client) computer 102 can select from the plurality of identifiers of possible users displayed in the drop-down menu 210b using any suitable input device (e.g., a trackpad) to auto-complete the fourth level resource path included in the partial URL of the exemplary HTTP GET request. For example, the user of the host (client) computer 102 can select the user identifier "user_admin", as indicated by the shaded region of the drop-down menu 210b. Further, once the user identifier "user_admin" is selected, the intelligent REST client webpage 200b can at least partially auto-complete the URL, as follows:

URL: /api/instances/user/user_admin. (5)

It is noted that without the capability of the intelligent REST client webpage 200b to auto-complete the fourth level resource path included in the partial URL of the HTTP GET request (see FIG. 2b), the user of the host (client) computer 102 would likely find it necessary to consult the server or API documentation for the required information, and manually enter the information ("user_admin") to complete the fourth level resource path of the partial URL.

Figure 2C:
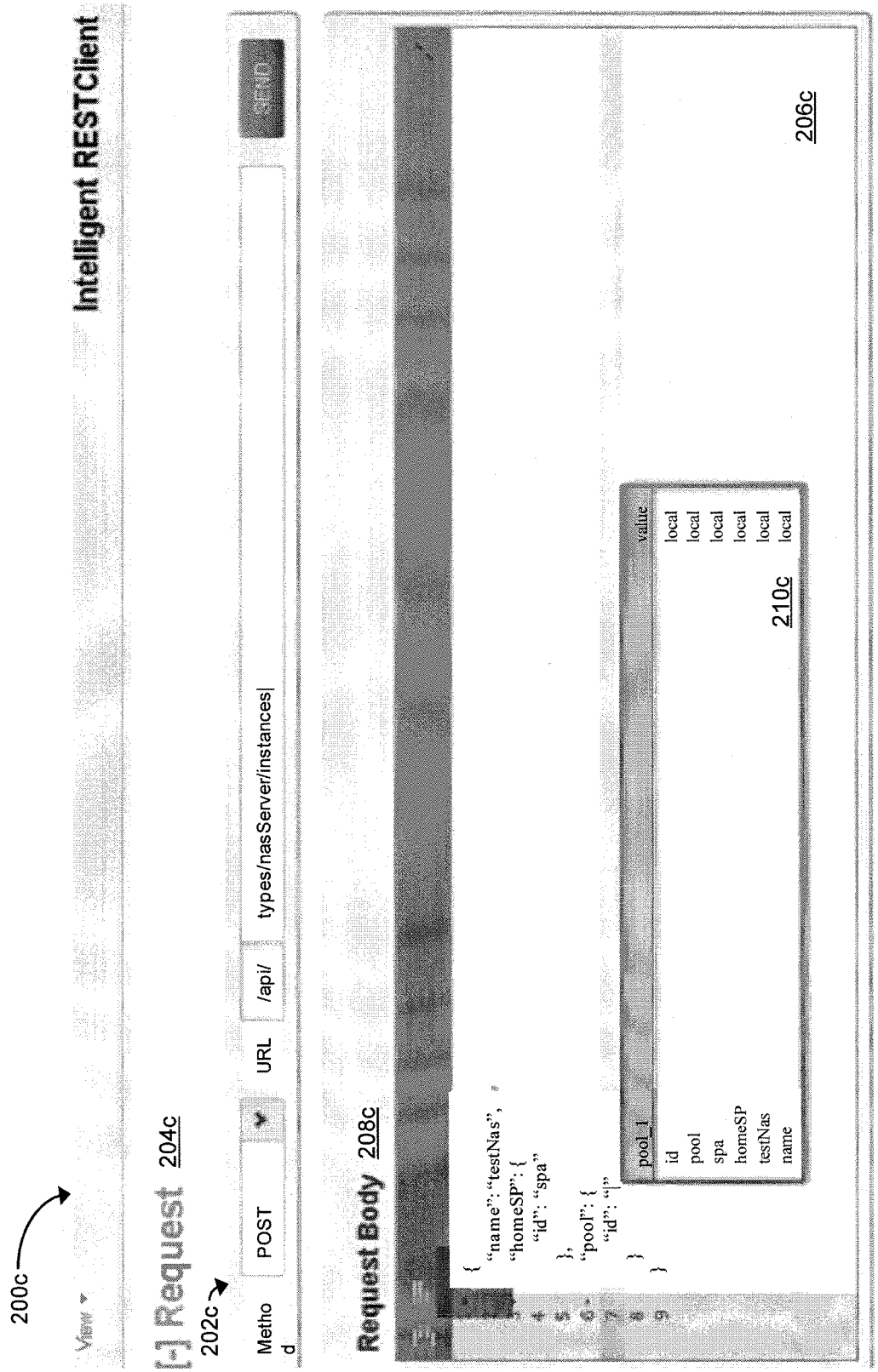
FIG. 2c is a third illustration of the intelligent REST client webpage of FIG. 1b, in which the intelligent REST client webpage is configured to allow the user of the respective client computer to generate a REST request using the HTTP POST request method.

In a third example, FIG. 2c depicts an illustration of an exemplary intelligent REST client webpage 200c, as displayed to the user of the host (client) computer 102 (see FIG. 1b) on the web browser 110. As shown in FIG. 2c, the intelligent REST client webpage 200c includes a user input area 202c for entering parameters required by a SET request 204c, as well as a user input area 206c for entering the body 208c of a REST request 204c. For example, the body 208c of the REST request 204c may be in JSON format, or any other suitable format. As shown in the user input area 202c, the user of the host (client) computer 102 has entered an exemplary HTTP POST request that includes the HTTP method "POST", as well as a URL that includes a first level resource path "api", a second level resource path "types", a third level resource path "nasServer", and a fourth level resource path "instances". As further shown in the user input area 206c, the request body 208c includes a plurality of arguments, such as "name", "homeSP": "id", and "pool": "id", as follows:

```
{                                           (6)
    "name": "testNas",
    "homeSP": {
        "id": "spa"
    },
    "pool": {
        "id": "|"
    }
}.
```

In this third example, the intelligent REST client webpage 200c has automatically provided values for several of the plurality of arguments that are acceptable to the HTTP POST request, such as the value "testNas" for the argument "name", and the identifier "spa" for the storage processor resource "homeSP". It is noted that the value "testNas" can be provided by the user of the host (client) computer 102, and that the identifier "spa" can be obtained on-demand when the intelligent REST client webpage 200b determines that the user wishes to make reference to the storage processor resource "homeSP". The argument "pool" refers to an existing storage pool on the data storage system 104 where the user of the host (client) computer 102 can create a NAS server. It is assumed, however, that the user of the host (client) computer 102 does not know the identifiers of the pools available on the existing storage pool where such a NAS server can be created. Nonetheless, as described herein, once served to the host (client) computer 102, the intelligent REST client webpage 200c can automatically send one or more types-feed queries 132 to the data storage system 104 to obtain, in one or more types-feed responses 134, metadata describing the APIs, including, but not limited to, one or more sets of information pertaining to the types of resources (or objects) available on the data storage system 104, the properties, operations, and/or parameters supported by the data storage system 104, etc., as well as the identifiers of the pools available on the existing storage pool corresponding to the argument "pool": "id".

FIG. 2*c* further depicts, in a drop-down menu 210*c*, one or more identifiers, property names, and/or parameter names obtained on-demand from the data storage system 104 in response to a resource query from the intelligent REST client webpage 200*c*. As shown in FIG. 2*c*, the identifiers can include "pool 1" and "spa", the property names can include "id", "pool", and "name", and the parameter names can include "homeSP" and "testNas". The user of the host (client) computer 102 can select from the one or more identifiers, property names, and/or parameter names displayed in the drop-down menu 210*c* using any suitable input device (e.g., a trackpad) to auto-complete the body 208*c* of the exemplary HTTP POST request. For example, the user of the host (client) computer 102 can select the identifier "pool_1", as indicated by the shaded region of the drop-down menu 210*c*. Further, once the identifier "pool_1" is selected, the intelligent REST client webpage 200*c* can at least partially auto-complete the request body 208*c*, as follows:

```
{                                                (7)
    "name": "testNas",
    "homeSP": {
        "id": "spa"
    },
    "pool": {
        "id": "pool_1"
    }
}.
```

It is noted that without the capability of the intelligent REST client webpage 200*c* to auto-complete the body 208*c* of the HTTP POST request (see FIG. 2*c*), the user of the host (client) computer 102 would likely find it necessary to consult the server or API documentation for the required information, and manually enter the information ("pool_1") to complete the request body 208*c*.

Figure 3:
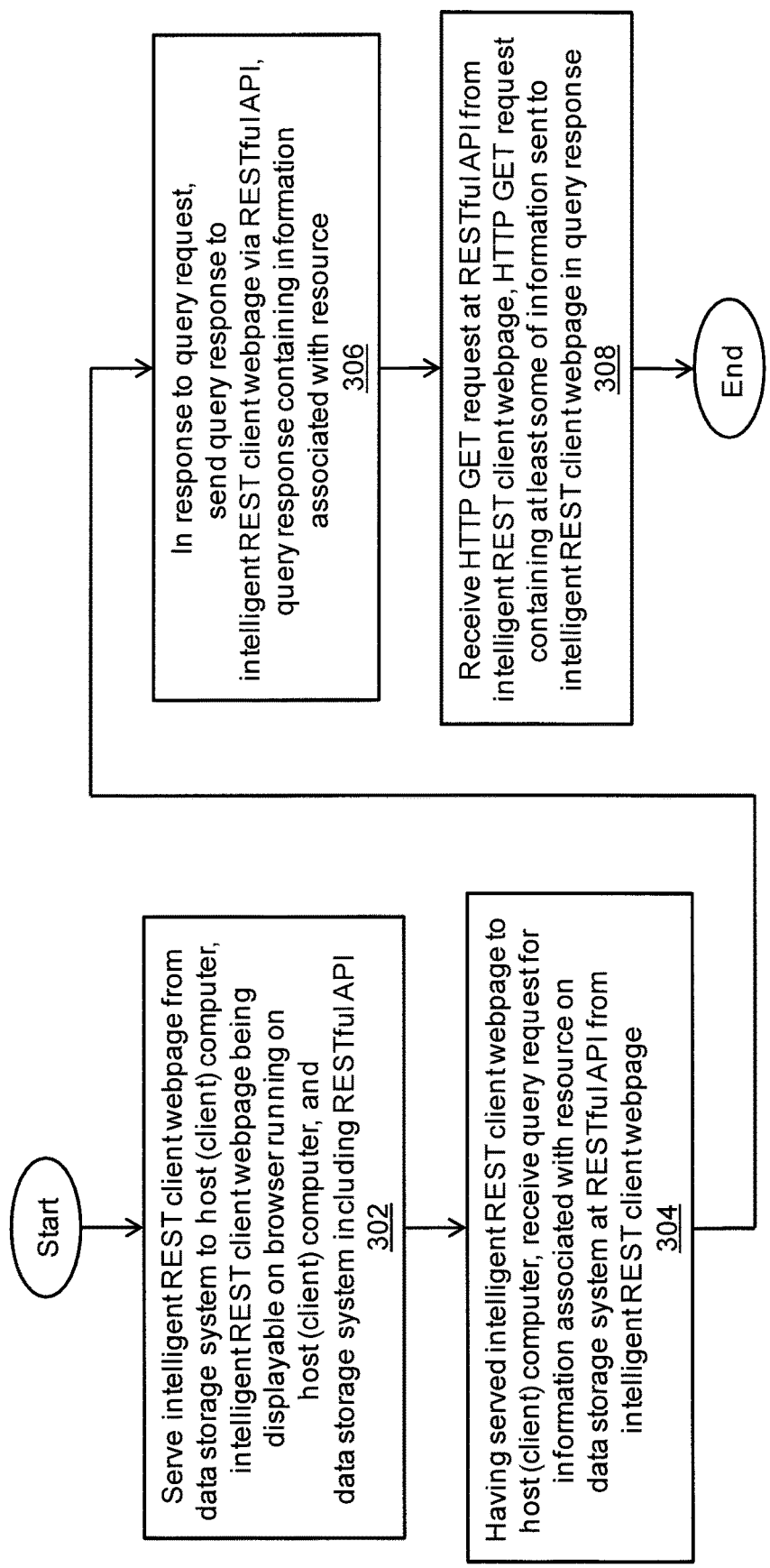
FIG. 3 is a flow diagram of an exemplary method of generating an HTTP GET request from a client computer to a server computer, using the intelligent REST client webpage of FIG. 1b accessed by a browser running on the client computer.

An exemplary method of generating an HTTP GET request from a host (client) computer to a data storage system using the disclosed intelligent REST client webpage is described herein with reference to FIGS. 1*b* and 3. As depicted in block 302 (see FIG. 3), the intelligent REST client webpage 122 (see FIG. 1*b*) is served from the data storage system 104 to the host (client) computer 102, the intelligent REST client webpage 122 being displayable on the web browser 110 running on the host (client) computer 102, and the data storage system 104 including the RESTful API 120. As depicted in block 304, having served the intelligent REST client webpage 122 to the host (client) computer 102, a query request for information associated with a resource on the data storage system 104 is received at the RESTful API 120 from the intelligent REST client webpage 122. As depicted in block 306, in response to the query request, a query response is sent to the intelligent REST client webpage via the RESTful API, the query response containing the information associated with the resource. As depicted in block 308, the HTTP GET request is received at the RESTful API from the intelligent REST client webpage, the HTTP GET request containing at least some of the information sent to the intelligent REST client webpage in the query response.

Having described the above illustrative embodiments of the disclosed systems, methods, and techniques, other alternative embodiments, modifications, and/or variations may be made. For example, it was described herein that the intelligent REST client webpage 122 (as displayed to the user on the web browser 110) (see FIG. 1*b*) can perform at least (i) auto-completion of a URL associated with a REST request 136 (e.g., resource type) (ii) auto-generation of the body of the REST request 136, and (iii) syntax-checking of the REST request 136, using the sets of information obtained from the types-feed responses 134. In certain alternative embodiments, the intelligent REST client webpage 122 can further perform auto-completion of the body of the REST request 136 (e.g., parameter name, parameter value), auto-generation of a template for the body of the REST request 136 (e.g., JSON format), as well as validity checking of the body of the REST request 136 (e.g., parameter name checking, JSON format syntax checking).

While various embodiments of the invention have been particularly shown and described, it will be understood by those skilled in the art that various changes in form and details may be made therein without departing from the scope of the invention as defined by the appended claims.

What is claimed is:

1. A system for generating a representational state transfer (REST) request, comprising:
    a data storage system including a RESTful application programming interface (RESTful API); and
    a client host computer running a browser application,
    wherein the data storage system is configured and arranged to:
        serve an intelligent REST client webpage to the client host computer for display on the browser application,
    wherein, having been served to the client host computer, the intelligent REST client webpage is configured and arranged to:
        automatically send, to the data storage system without requiring a manual user input, a types-feed request for information associated with a particular resource on the data storage system, and
    wherein the data storage system is further configured and arranged to:
        receive, at the RESTful API, the types-feed request from the intelligent REST client webpage;
        in response to the types-feed request, send, via the RESTful API, a types-feed response to the intelligent REST client webpage, the types-feed response containing the information associated with the particular resource; and
        receive, at the RESTful API, the REST request from the intelligent REST client webpage, the REST request containing at least some of the information sent to the intelligent REST client webpage in the types-feed response.

2. The system of claim 1 wherein the types-feed request includes a parameter requesting the information associated with the particular resource, the information including a list of available properties of the particular resource on the data storage system.

3. The system of claim 2 wherein the types-feed response includes a field containing the list of available properties of the particular resource on the data storage system.

4. The system of claim 1 wherein the REST request corresponds to one of a hypertext transfer protocol (HTTP)

GET request, an HTTP POST request, an HTTP PUT request, an HTTP PATCH request, and an HTTP DELETE request.

5. The system of claim 1 wherein the browser application running on the client host computer is configured and arranged to display the intelligent REST client webpage on the client host computer.

6. The system of claim 5 wherein the intelligent REST client webpage includes a user input area, and wherein the intelligent REST client webpage, once displayed on the client host computer, is configured and arranged to:
    detect entry of one or more characters in the user input area, the one or more characters corresponding to a designation of an object related to the particular resource on the data storage system; and
    based on the detected entry of the one or more characters in the user input area, display a drop-down menu including a plurality of designations starting with the one or more characters in the user input area.

7. The system of claim 6 wherein the intelligent REST client webpage, once displayed on the client host computer, is further configured and arranged to:
    receive a user selection of a respective designation among the plurality of designations included in the drop-down menu; and
    auto-complete the designation of the object related to the particular resource using the respective designation.

8. The system of claim 5 wherein the intelligent REST client webpage includes a user input area, and wherein the intelligent REST client webpage, once displayed on the client host computer, is configured and arranged to:
    detect entry of a plurality of characters in the user input area, the plurality of characters designating an object of the particular resource on the data storage system; and
    based on the plurality of characters designating the object of the particular resource on the data storage system, display a drop-down menu including a plurality of possible designations for a next object of the particular resource to be entered in the user input area.

9. The system of claim 8 wherein the intelligent REST client webpage, once displayed on the client host computer, is further configured and arranged to:
    receive a user selection of a respective designation among the plurality of possible designations included in the drop-down menu; and
    auto-complete the REST request using the respective designation.

10. The system of claim 5 wherein the intelligent REST client webpage includes a user input area for entering a body of the REST request, and wherein the intelligent REST client webpage, once displayed on the client host computer, is configured and arranged to:
    detect entry of a plurality of characters in the user input area of the body of the REST request, the plurality of characters designating an argument corresponding to the particular resource on the data storage system; and
    based on the plurality of characters designating the argument corresponding to the particular resource on the data storage system, display a drop-down menu including a plurality of possible values for the argument to be entered in the user input area of the body of the REST request.

11. The system of claim 10 wherein the intelligent REST client webpage, once displayed on the client host computer, is further configured and arranged to:
    receive a user selection of a respective value among the plurality of possible values included in the drop-down menu; and
    auto-complete the body of the REST request using the respective value for the argument.

12. A method of generating a representational state transfer (REST) request to a data storage system using a browser running on a client host computer, the method comprising:
    serving an intelligent REST client webpage from the data storage system to the client host computer, the intelligent REST client webpage being displayable on the browser running on the client host computer, the data storage system including a RESTful application programming interface (RESTful API);
    having served the intelligent REST client webpage to the client host computer, automatically sending, by the intelligent REST client webpage to the data storage system without requiring a manual user input, a types-feed request for information associated with a particular resource on the data storage system;
    receiving, at the RESTful API, the types-feed request from the intelligent REST client webpage;
    in response to the types-feed request, sending, via the RESTful API, a types-feed response to the intelligent REST client webpage, the types-feed response containing the information associated with the resource; and
    receiving, at the RESTful API, the REST request from the intelligent REST client webpage, the REST request containing at least some of the information sent to the intelligent REST client webpage in the types-feed response.

13. The method of claim 12 further comprising:
    displaying, by the browser application running on the client host computer, the intelligent REST client webpage on the client host computer.

14. The method of claim 13 wherein the intelligent REST client webpage includes a user input area for entering a body of the REST request, and wherein the method further comprises:
    detecting entry, by the intelligent REST client webpage, of a plurality of characters in the user input area of the body of the REST request, the plurality of characters designating an argument corresponding to the particular resource on the data storage system; and
    based on the plurality of characters designating the argument corresponding to the particular resource on the data storage system, displaying, on the intelligent REST client webpage, a drop-down menu including a plurality of possible values for the argument to be entered in the user input area of the body of the REST request.

15. The method of claim 14 further comprising:
    receiving, at the intelligent REST client webpage, a user selection of a respective value among the plurality of possible values included in the drop-down menu; and
    auto-completing, by the intelligent REST client webpage, the body of the REST request using the respective value for the argument.

16. A computer program product having a non-transitory computer readable medium that stores a set of instructions that, when carried out by computerized circuitry, cause the computerized circuitry to perform a method of generating a representational state transfer (REST) request to a data storage system using a browser running on a client host computer, the method comprising:
    serving an intelligent REST client webpage from the data storage system to the client host computer, the intelligent REST client webpage being displayable on the browser running on the client host computer, the data storage system including a RESTful application programming interface (RESTful API);

having served the intelligent REST client webpage to the client host computer, automatically sending, by the intelligent REST client webpage to the data storage system without requiring a manual user input, a types-feed request for information associated with a particular resource on the data storage system;

receiving, at the RESTful API, the types-feed request from the intelligent REST client webpage;

in response to the types-feed request, sending, via the RESTful API, a types-feed response to the intelligent REST client webpage, the types-feed response containing the information associated with the resource; and receiving, at the RESTful API, the REST request from the intelligent REST client webpage, the REST request containing at least some of the information sent to the intelligent REST client webpage in the types-feed response.

17. The computer program product of claim 16 wherein the method further comprises:

displaying, by the browser application running on the client host computer, the intelligent REST client webpage on the client host computer.

* * * * *